C. WEIKERT.
PLANTER ATTACHMENT.
APPLICATION FILED APR. 19, 1911.
998,060. Patented July 18, 1911.
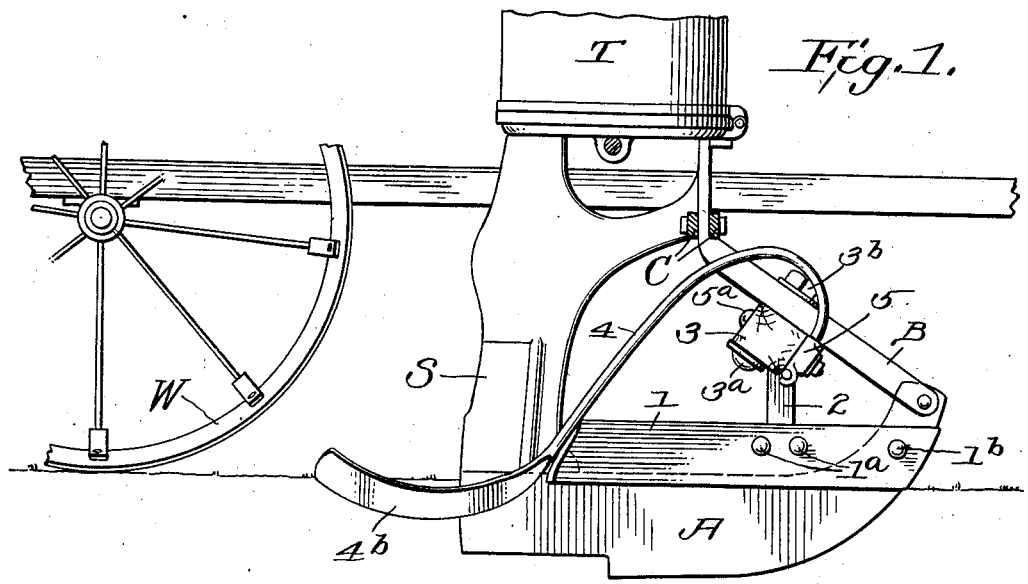
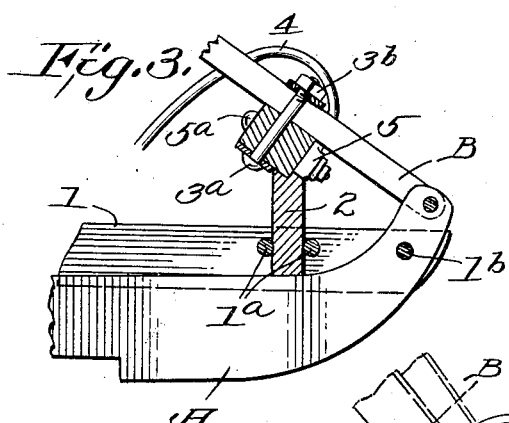
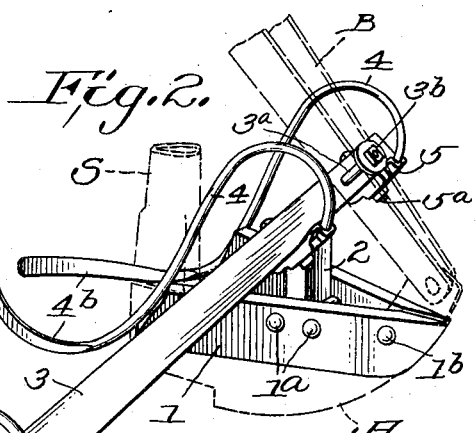
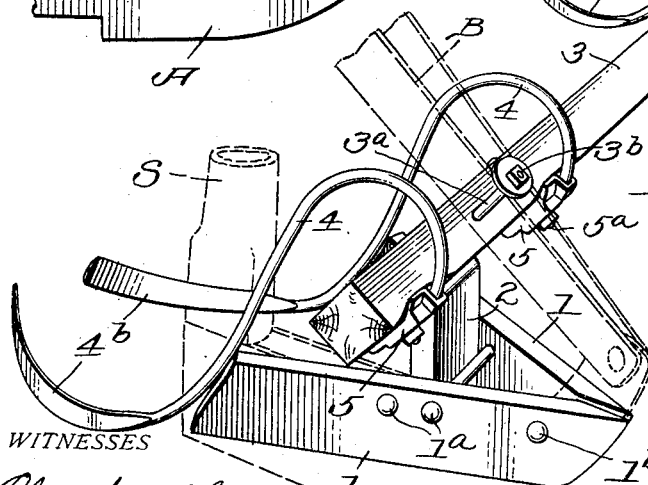
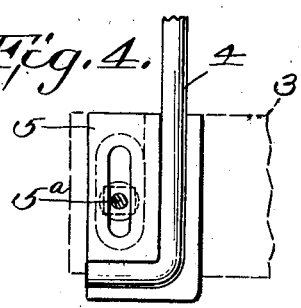
WITNESSES INVENTOR
Christ Weikert
Alexander Powell Attorneys

UNITED STATES PATENT OFFICE.

CHRIST WEIKERT, OF MUSCATINE, IOWA.

PLANTER ATTACHMENT.

998,060.　　　　Specification of Letters Patent.　　Patented July 18, 1911.

Application filed April 19, 1911.　Serial No. 622,062.

*To all whom it may concern:*

Be it known that I, CHRIST WEIKERT, of Muscatine, in the county of Muscatine and State of Iowa, have invented certain new and useful Improvements in Planter Attachments; and I hereby declare that the following is a full, clear, and exact description thereof, reference being had to the accompanying drawings, which form part of this specification.

This invention is a novel attachment for planters of the well known type in which suitable devices are employed to open the furrows and the seed is dropped into the furrows and covered.

The object of the present invention is to provide novel attachments for such planters whereby the ground may be cleared of obstructions at the sides of the furrow openers and in front of the covering devices, and all the rubbish will be shifted to the sides of the rows, and the corn will be covered in advance of the wheels so that the seed can all be planted at uniform depth, and there will be nothing to obstruct the growth of the plants or grain. The attachments in other words assist in preparing the ground for the reception of the seed and in covering the seed, and insure greater uniformity in the planting of the seed, and the rows are left clear and in good alinement.

The invention consists in the novel attachments hereinafter more fully described and claimed, and illustrated in the accompanying drawings.

In said drawings I have illustrated the attachments as applied to any well known form of corn-planter, and for clearness I will designate the parts that are old by reference letters, and parts that are new, and which embody the present invention, by reference numerals.

In said drawings—Figure 1 is a side elevation of part of a planter equipped with my novel attachment. Fig. 2 is a detail perspective view showing the attachments. Fig. 3 is a detail central vertical and longitudinal sectional view of the attachment;
and Fig. 4 is a detail.

In the drawings, A represents one of the shoes or runners such as are ordinarily employed in corn planters to open the furrows in advance of the covering wheels W.
These shoes are connected at their front ends to arms B which are attached to a cross bar C, which may be of any ordinary construction, so that it can be shifted or rocked so as to raise and lower the shoes A. The seed is conducted from the seed boxes T through suitable spouts S into the furrow opened by the shoe. Each and all of the aforesaid parts may be of any desired or suitable construction and are not part of the present invention.

In order to remove the rubbish away from the furrow openers and assist in clearing the ground and preparing it for the reception of the seed I provide the following novel attachments: Attached to each shoe A, near the front end thereof and above the normal ground surface line, are V-shaped scrapers or clearers composed of opposite divergent plates 1, which are connected at their front ends by a bolt $1^b$ which also attaches them to the related shoe A. The clearers 1 diverge on opposite sides of the shoe and may be suitably spaced apart at the rear by a spacer 2 arranged edgewise therebetween and secured thereto by means of through-bolts $1^a$, two of which are preferably employed, and which bond the plates 1 securely together laterally. These plates 1 and spacer 2 may be of metal or of wood;
I have made them of wood and found them to work very satisfactorily. Attached to the arms B is a bar 3, which may also be of wood, extending parallel with the bar C and above the clearers 1 and preferably located in such position that the upper end of spacers 2 abuts thereagainst, as shown in Figs. 1 and 3, and thus securely braces the clearers and holds their rear ends down in proper position to operate upon the surface of the ground. The bar 3 may be conveniently attached to the arms B by means of bolts $3^a$ transfixing bars 3 and passing through slots or openings in the arms B and secured by washers and nuts $3^b$, as indicated in the drawings.

Attached to the bar 3 at opposite sides of each arm B and above each shoe A are seed coverers 4, which are approximately S-shaped, and have their upper ends secured to bar 3 by castings 5 and bolts $5^a$ (Fig. 4). The coverers curve up over the bar and then down below the bar to and in rear of the adjacent furrow opener or shoe A (Figs. 1 and 2) and their lower ends are bent inwardly and broadened, as at $4^b$, into a kind of spoon shape, as shown in Figs. 1 and 2, and their lower ends lie in such position that they will cover the grain dropped into the furrows from the spouts S.

There should be as many clearers 1 and sets of co-acting coverers 4, as there are furrow openers in the machine. When the attachments are properly applied and the machine is in position for planting the shoes A are lowered so as to cut furrows of the proper depth, then the lower edges of the plates or clearers 1ª will be about even with the normal surface of the ground. Then, as the machine is drawn forward, the furrow openers A open the furrows and the clearers 1 clear the surface of the ground at each side of the furrow opener;—by forcing trash, clods and stones out of the way, and the coverers 4 cover the seed dropped into the furrow in advance of the wheels. The coverers 4 bury their spoon ends in the soil while operating and draw the loose earth toward and over the furrow and slightly ridge it.

As the clearers remove the rubbish from the rows in advance of the wheels the machine can proceed directly forward and lateral jerking and sidewise movements of the machine are lessened; consequently irregular dropping of the seed is prevented, which would happen if the wheels had to pass over numerous obstructions as they would have to do if the furrows were not cleared. The device can be easily attached to many of the ordinary makes of seed planters now in use, and has been thoroughly tried out, and found most efficient.

What I claim is:

1. In combination with a planting machine having a furrow opener, and arms to which said furrow opener is connected; with clearer plates on opposite sides of the furrow opener and diverging toward their rear ends; a brace bar interposed between said clearer plates, and a bar attached to said arms above the spacer plates, and coverers attached to said bar and extending below and in rear of the clearer plates.

2. In combination with a planter having a furrow opener, arms to which the forward ends of the opener are attached, and means for dropping seed in the furrow; with angularly disposed clearer plates on opposite sides of the furrow opener, a spacing and bracing bar attached to and between the said clearer plates, and S-shaped coverers having their upper ends attached to said arms, and their lower ends depending below and in rear of the clearer plates and adapted to cover the seed, substantially as described.

3. In combination with a planting machine having furrow opening shoes, and arms to which said shoes are connected; with clearer plates attached to opposite sides of the furrow openers and divergent toward their rear ends; a spacing and brace bar interposed between said clearer plates, a bar attached to said arms above the spacing bar and contacting therewith; and coverers attached to said bar and extending below and in rear of the clearers.

4. In combination with a planter having furrow opening shoes, arms to which the forward ends of the shoes are attached, and means for dropping seed in the furrows opened by the shoes; with angularly disposed clearer plates attached at their forward ends to the forward ends of each shoe, a spacing and bracing bar attached to and between the said clearer plates, a bar attached to the arms above the spacer bars, and S-shaped coverers having their upper ends attached to said bar, and their lower ends depending below and in rear of the clearer plates and adapted to cover the seed, substantially as described.

In testimony that I claim the foregoing as my own, I affix my signature in presence of two witnesses.

CHRIST WEIKERT.

Witnesses:
 FRANK J. STOHR,
 CLARK A. MILLER.

---

Copies of this patent may be obtained for five cents each, by addressing the "Commissioner of Patents, Washington, D. C."